United States Patent [19]

Hahn et al.

[11] 4,331,465

[45] May 25, 1982

[54] PROCESS FOR THE PRODUCTION OF NPK FERTILIZERS RESISTANT TO SMOLDERING DECOMPOSITION AT ELEVATED TEMPERATURES

[75] Inventors: Heinrich Hahn, Gelsenkirchen-Buer; Hans-Friedrich Kurandt, Lüneburg, both of Fed. Rep. of Germany

[73] Assignee: Chemische Werke Huls Aktiengesellschaft, Kreis Recklinghausen, Fed. Rep. of Germany

[21] Appl. No.: 100,732

[22] Filed: Dec. 6, 1979

[30] Foreign Application Priority Data

Dec. 6, 1978 [DE] Fed. Rep. of Germany ....... 2852643

[51] Int. Cl.$^3$ .................. C05B 19/00; C05B 21/00
[52] U.S. Cl. .................................. 71/42; 71/33; 71/50; 71/64.3
[58] Field of Search .................. 71/36, 33, 43, 50, 42, 71/64.6, 64.3, 39, 64.2

[56] References Cited

U.S. PATENT DOCUMENTS 3,028,230  4/1962  Brosheer ........................... 71/39 X
4,154,593  5/1979  Brown et al. ....................... 71/33

FOREIGN PATENT DOCUMENTS 1048280  1/1957  Fed. Rep. of Germany .......... 71/39
2132834  11/1972  France .
308992  9/1971  U.S.S.R. ................................ 71/39
618362  8/1978  U.S.S.R. ................................ 71/39

OTHER PUBLICATIONS

Sauchelli, Fertilizer Nitrogen, 1964, Reinhold Pub. Corp., N.Y., pp. 308, 309.

*Primary Examiner*—Kenneth M. Schor
*Attorney, Agent, or Firm*—Oblon, Fisher, Spivak, McClelland & Maier

[57] ABSTRACT

The invention relates to a method of preventing smoldering decomposition of multiple-nutrient fertilizers containing ammonium nitrate at elevated temperatures by treatment of the granulated, dried and screened fertilizer with ammonia.

4 Claims, No Drawings

PROCESS FOR THE PRODUCTION OF NPK FERTILIZERS RESISTANT TO SMOLDERING DECOMPOSITION AT ELEVATED TEMPERATURES

BACKGROUND OF THE INVENTION

The invention relates to a method of preventing smoldering decomposition (cigar burning) of multiple-nutrient fertilizers containing ammonium nitrate at elevated temperatures by secondary treatment of the granulated, dried and screened fertilizer with ammonia.

The manufacture, storage and handling of compound fertilizers containing ammonium nitrate demands special safety measures. Unlike pure ammonium nitrate, by reason of their content of inert matter, they are not explosive, but, in certain compositions they are capable of exothermic decomposition under the influence of external heat sources. Thus, a temperature of above 200° C. is sufficient to ignite this kind of fertilizer. An ignition of this kind then propagates as a smoldering decomposition even without the access of oxygen, since the fertilizer itself contains the oxygen necessary for combustion in the form of the nitrate.

It is known from smoldering fires which have occurred in fertilizer warehouses and in ships that compound fertilizers tend to decompose in this manner only if they contain chlorides in addition to ammonium nitrate. This, as a rule, is the case in most NPK fertilizers, which, as is well known, contain potassium chloride as a source of potassium.

Fertilizers containing:
Ammonium nitrate,
(potassium) chloride and
dicalcium phosphate
are particularly endangered by smoldering decomposition. Also, the percentage of inert ingredients should not be too high.

These fertilizers may also contain ammonium phosphate, calcium phosphate, calcium nitrate, trace elements and other additives, as well as, under certain circumstances, the reaction products of the main components, for instance, potassium nitrate and ammonium chloride. In fertilizers containing exclusively water-soluble $P_2O_5$, for instance also those produced from superphosphates or double super-phosphates, with $Ca(H_2PO_4)_2$ as their main ingredient, instances of smoldering decomposition have not generally been observed. In mixtures, however, which do not contain $P_2O_5$, e.g., such as mixtures of ammonium nitrate, potassium chloride and ammonium sulfate, smoldering decomposition has been observed.

This smoldering composition ("cigar burning") is frequently observed in fertilizers of the type 15/15/15 and 13/13/21. The fertilizer of the type 10/10/15 and those which contain still more inert matter (and therefore less of the nutrients) do not seem to exhibit this effect.

In order to prevent this cigar burning, several additives have been proposed, for instance, alkaline earth sulfates or carbonates or alkali metal borates or (poly)-phosphates.

As described in German Auslegeschrift No. 2,117,355, prevention of this smoldering decomposition is achieved by adding 3–25% ammonium sulfate to the fertilizer during production, while at the same time, the proportion of water-soluble phosphoric acid is increased to 30–70% of the total phosphate content in order to maintain the predetermined ratio of nutrients.

This step suffices in order to prevent a smoldering decomposition of fertilizer at room temperatures of 20° C. to 30° C., even if it should be heated at one point to the ignition temperature of about 200° C.

Recently, cases of fertilizer fires have become known, where, for instance, a barn caught fire and subsequently the fertilizer stored therein ignited because of the effect of the heat generated by the fire of the barn. In all such cases the fertilizer is first heated to a higher temperature and, as soon as the ignition point has been reached, it begins to smolder.

The usual decomposition tests made with fertilizers at normal temperatures (20° C.) can only be conditionally applied to these circumstances. In tests we have conducted, we found, that fertilizers which were non-flammable at normal temperatures, did indeed decompose and smolder at higher temperatures, for instance after having been pre-heated to 60° C. prior to ignition. This effect was to be expected since the heat of reaction of smoldering in this case is not being used to raise the temperature of the fertilizer, but directly contributes to the acceleration of the decomposition reaction.

SUMMARY OF THE INVENTION

We have now discovered that with regard to mixtures of fertilizers already containing additives for preventing this cigar burning, it is possible to render them immune to decomposition at elevated temperatures if the granulated, dried and screened product is post-treated with ammonia.

This applies in particular to fertilizers which are protected from cigar burning at room temperature according to German Auslegeschrift No. 2,117,355.

A method is already known, whereby ammonium nitrate and ground limestone, after mixing in a granulating screw with addition of ammonium nitrate solution in ammonia and/or the introduction of liquid or gaseous ammonia in a gas-tight granulating screw, is pulverized and subsequently freed of excess ammonia in a rotary drum through which air is passed.

The process of the invention differs from this method insofar as not KAS, but NP- and NPK fertilizers respectively are being produced, and that, in addition the already screened product is given a post-treatment with ammonia.

For KAS, the treatment with ammonia serves to suppress the formation of calcium nitrate, which would take place according to the equation:

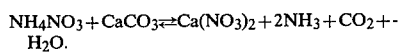
$$NH_4NO_3 + CaCO_3 \rightleftharpoons Ca(NO_3)_2 + 2NH_3 + CO_2 + H_2O.$$

By the addition of $NH_3$, the equilibrium, which, at mixing temperatures of 135° C., would easily result in calcium nitrate contents of more than 1%, is displaced to the side of the $NH_4NO_3/CaCO_3$.

In the NPK fertilizers, $Ca(NO_3)_2$ is not in general present; calcium has been removed, particularly in high-percentage fertilizers, by a pre-treatment in the form of $Ca(NO_3)_2$ (by freezing out) or in the form of $CaSO_4$ (by addition of sulfates or sulfuric acid and subsequent filtering), or it is present exclusively as $CaHPO_4$ or in a similar form.

The post-ammoniation of the fertilizer according to the invention, has no relationship to the known process, wherein, during the production of the fertilizer, for instance, ammonia is added in a granulating drum, prior to the drying of the products, but it is always concerned with ammonia treatment of the already granulated, dried and screened material; therefore of a fertilizer which, in this form, is normally considered a finished product, and which, as such, is also stored in warehouses or directly shipped out.

The dried and screened fertilizer prior to post-ammoniation, suitably is cooled, if possible to temperatures below 30° C., but at least below 50° C.

The ammonia is supplied in the gaseous state. Its temperature should not be higher than that of the fertilizer. It is possible to use liquid ammonia, but it results in metering and distribution problems, so that the use of gaseous ammonia generally is preferred.

Ammoniation usually takes place under a slightly elevated pressure. Generally, pressures of more than 5 bar should be avoided. Evidently, the stream of ammonia can also be drawn through the ammoniation chamber using a slightly decreased pressure.

For the post-ammoniation, ammonia is added in such amounts, that samples taken after the ammoniator (10 g, mixed with distilled water to make 100 ml), give pH values between 7.0 and 8.5 and, preferably between 7.5 and 8.0.

DESCRIPTION OF THE PREFERRED EMBODIMENT

The ammoniation of the dried, granulated product is carried out in, for instance, a discharge hopper, into which fertilizer is continuously introduced and withdrawn. In this filled hopper the ammonia is introduced just above the outlet. With the above described technique, there are no ammonia losses, since the ammonia introduced is completely absorbed by the dry, granulated material.

The ammonia uptake is greater than in the known cases in which, for instance, ammonia is added in a granulating drum prior to drying, since during the drying of such a highly ammoniated product, part of the introduced ammonia escapes and therefore the prevention of the cigar burning according to the invention no longer can be achieved. Using the method of the invention comprising post-ammoniation of the finished product after drying, no ammonia losses were apparent.

The post-ammoniated product becomes warm during the addition of the ammonia, and it is convenient to cool it again below 30° C. before compounding with anti-caking ingredients or a possible temporary storage.

It is understood that other equipment than a discharge hopper may be used for the ammoniation step, as, for instance, granulating screws, granulating drums, suspension coolers, or fluidizing equipment.

The collected results of tests of 15+15+15 fertilizer shown in the Table illustrate the effect of the process of this invention.

Results of Smoldering Tests of 15 + 15 + 15
With and Without Post-ammoniation (A) Smoldering Test Without Post-Ammoniation

| Example No. | Ammonium Sulfate Added | Water Soluble $P_2O_5$ % of Total $P_2O_5$ | Temperature of Fertilizer prior to Ignition | Burning distance c.m. | Burning speed cm./hr |
|---|---|---|---|---|---|
| 1 | — | 30 | 20 | 50 | 11 |
| 2 | — | 30 | 60 | 50 | 24 |
| 3 | 15.0 | 60 | 20 | 0 | 0 |
| 4 | 15.0 | 60 | 60 | 50 | 8 |

(B) Smoldering Test With Post-Ammoniation

| | | | | | |
|---|---|---|---|---|---|
| 5 | — | 30 | 20 | 50 | 7 |
| 6 | — | 30 | 60 | 50 | 12 |
| 7 | 15.0 | 60 | 20 | 0 | 0 |
| 8 | 15.0 | 60 | 60 | 0 | 0 |

A post-ammoniation of normally prepared compound fertilizers results in a reduced decomposition speed, but does not prevent decomposition as such (Sample Nos. 5 and 6 as opposed to Nos. 1 and 2).

The products made according to German Auslegeschrift No. 2,117,355 are not subject to cigar burning at room temperature (Sample 3); however, when preheated to 60° C. (No. 4) they are no longer protected from it.

However, if these samples are pre-treated with $NH_3$ prior to the test, they resist smoldering decomposition at room temperature (Sample 7) as well as after preheating to 60° C. (Sample 8).

What is claimed as new, and intended to be covered by Letters Patent is:

1. A process for producing an NPK fertilizer resistant to smoldering decomposition at elevated temperatures as well as at room temperature, comprising:
   providing an NPK fertilizer containing ammonium nitrate, potassium chloride, calcium phosphate, mono- and di-ammonium phosphate in an amount of 30–70% of the entire $P_2O_5$ content, and ammonium sulfate in an amount of 3–25% by weight based on the fertilizer, sequentially granulating, drying and screening said fertilizer, and then as a final step, post-ammoniating said fertilizer with ammonia to the degrees needed to achieve said resistance to smoldering decomposition at elevated temperatures.

2. A process according to claim 1, wherein the fertilizer is cooled subsequent to drying and screening and prior to post-ammoniation.

3. A process according to claim 1 or 2, wherein the ammoniation is performed within a hopper or a corresponding drum provided with mixing devices and means for continuous introduction and removal of the fertilizer.

4. A process according to claim 1 or 2, wherein the subsequent ammoniation is performed within a suspension cooler.

* * * * *